Nov. 16, 1937. G. A. LYON Re. 20,553
ORNAMENTAL PLATE FOR WHEELS
Original Filed Dec. 12, 1932
FIG. 1.
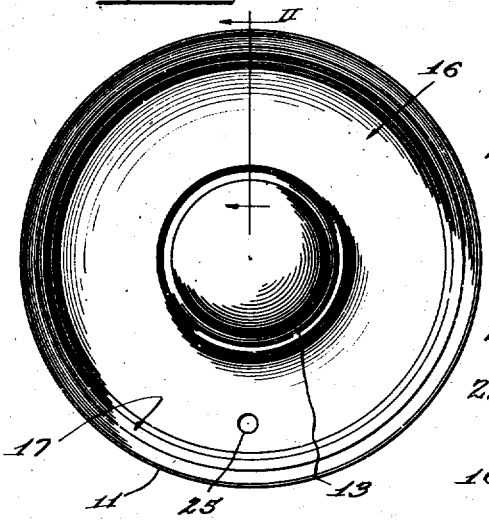
FIG. 2.
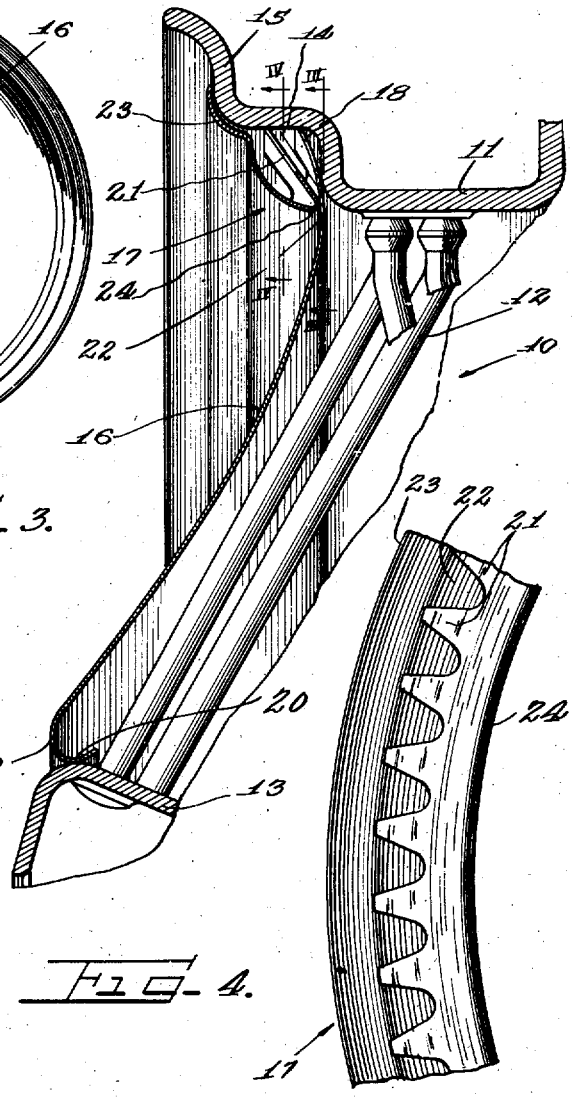
FIG. 3.
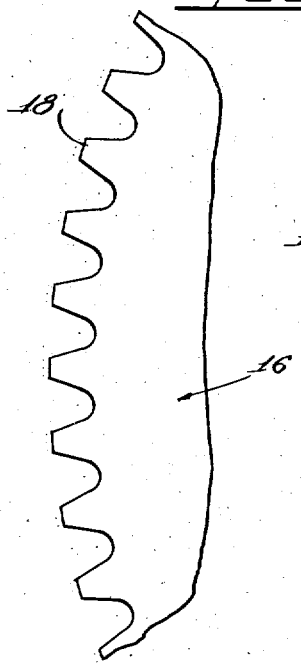
FIG. 4.
INVENTOR
GEORGE ALBERT LYON.
BY Charles H. Hill ATTY.

Reissued Nov. 16, 1937 Re. 20,553

UNITED STATES PATENT OFFICE 20,553

ORNAMENTAL PLATE FOR WHEELS

George Albert Lyon, Allenhurst, N. J.

Original No. 1,949,317, dated February 27, 1934, Serial No. 646,762, December 12, 1932. Application for reissue January 28, 1935, Serial No. 4,997

19 Claims. (Cl. 301—37)

The present invention relates in general to an ornamental plate structure for an automobile wheel and more particularly to an ornamental ring-like plate adapted to be disposed between the wheel rim and hub of an automobile wheel to cover the spokes thereof and provided with a bead for aiding in retaining the plate in proper position over the spokes.

An object of this invention is to provide an ornamental plate structure for disposition over the spokes of an automobile wheel and which may be so secured in position as to not require any modification or change in the automobile wheel.

Another object of the invention resides in the provision of an ornamental plate for disposition over the spokes of a wheel and a circular bead for aiding in retaining the plate in proper position over the spoke.

In accordance with the general features of the invention there is provided a ring-like plate having its outer periphery formed into a plurality of teeth for engaging the rim and having its inner periphery formed to yieldably engage the hub of the wheel, the radial teeth of said ring-like plate being adapted to be concealed by a circular bead including yieldable projections for engaging the wheel rim to aid in the holding of the ring-like plate in proper position over the spokes between the wheel rim and the hub.

Other objects and features of this invention will more fully appear from the following detailed description taken in connection with the accompanying drawing which illustrates a single embodiment thereof and in which Figure 1 is a side view of my novel wheel ornamental structure showing the structure applied to a wheel;

Figure 2 is an enlarged fragmentary sectional view taken on substantially the line II—II of Figure 1 looking in the direction indicated by the arrow;

Figure 3 is a fragmentary view of a portion of the teeth on the outer periphery of the ring-like plate of my ornamental structure and Figure 4 is a fragmentary detailed view of a portion of the circular bead taken on substantially the line IV—IV of Figure 2 looking in the direction indicated by the arrow.

The reference character 10 designates generally a wheel which includes a rim 11 connected by spokes 12 to a wheel hub 13. This wheel structure may be of any suitable conventional design.

The wheel rim 11 has an inner annular surface 14 which is adapted to be engaged by my novel ornamental plate structure and which rim surface 14 terminates in an outwardly extending flange or lip 15 formed to engage around the bead of the conventional tire. It might further be noted that the wheel rim illustrated in Figure 2 is of the so-called drop center type which is now being used extensively in the automobile industry.

The ornamental device of my invention for disposition over the wheel spoke 12 includes a ring-like plate 16 of curved transverse cross-section and a circular bead 17 which is also of curved transverse cross-section. The ring-like plate 16 has its outer periphery formed into a plurality of radially extending teeth or projections 18 for yieldably engaging the rim surface 14 as shown in Figure 2. The inner margin of the ring-like plate 16 is turned back upon itself as indicated at 19 to provide a yieldable metal flange 20 for engaging the hub 13 of the wheel.

The ring-like plate 16 may be of any suitable configuration or shape and is illustrated in the accompanying drawing as being of a transversely curved cross-section so as to be disposed in close proximity to the spokes 12 of the wheel. The outer surface of this plate as well as that of the bead may be given any desirable ornamental finish but is preferably provided with a lustrous finish such as is secured by plating it with nickel or chromium.

The circular bead 17 includes underturned yieldable teeth or projections 21 for biting into the rim surface 14 in close proximity to the engagement of that surface by the plate teeth 18. These diagonally extending teeth or projections 21 are normally concealed by an outer transversely curved portion 22 which terminates in a curved extension 23 adapted to overlie a portion of the outwardly extending flange or lip 15 of the wheel rim 11. This circular bead 17 is preferably in the form of a continuous circle and is adapted to be retained in place on the wheel rim solely by reason of the engagement of the yieldable teeth 21 with the rim surface 14.

At the junction 24 of the toothed portion 21 and the outer portion 22 of the bead it will be noted from Figure 2 that such junction portion of the bead is adapted to bear against the plate 16 to aid in retaining the plate in proper position over the spokes of the wheel.

Now in the application of my ornamental device to a wheel the plate 16 is first pressed into position over the spokes of the wheel. During this operation the inwardly turned flange portion 20 of the ring-like plate is brought into yielding engagement with the wheel hub 13 and the radial teeth 18 of the plate are flexed into retaining and biting engagement with the rim surface 14. Thereafter the circular bead 17 is progressively pressed into position so that the oblique teeth or projections 21 thereof are brought into biting engagement with the rim surface 14 and the junction portion 24 of the bead is brought into contact with the plate 16 as previously noted.

It should also be noted that the flexible toothed portion 21 of the bead is preferably of a normally greater diameter than that of the surface 14 of the wheel rim to which it is applied and that the teeth of this portion are deflectable with reference to the rim surface so as to apply pressure outwardly against said rim surface. Also the angle of these teeth 21 is such as to result in such teeth biting into the surface of the rim 14. Furthermore any tendency to displace the circular bead augments the biting engagement of the teeth in the surface 14. In other words, any tendency of the bead 17 to spring back out of position over the surface 14 automatically results in the teeth 21 biting still further into the surface 14 thereby insuring a tight engagement of the bead with such rim surface.

I have found from actual experience that the biting grip of the teeth 21 on the surface 14 is so great as to cause the tips of such teeth to become embedded in that surface. Needless to say the cooperation of the bead 17 with the plate 16 as illustrated in the accompanying drawing is such as to insure retention of the ring-like plate 16 in a proper covering position over the spokes 12 of the wheel.

The plate 16 is provided with an opening 25 (Figure 1) which is adapted to accommodate an extension connected to the valve stem of the inner tube carried by the wheel rim so that access may be had to the valve stem for the purpose of inflating and deflating the tire. Any suitable valve stem extension may be used for this purpose.

Now I desire it understood that although I have illustrated and described in detail the preferred embodiment of this invention the invention is not to be thus limited, but only insofar as defined by the scope and spirit of the appended claims.

I claim as my invention:

1. As an article of manufacture, an automobile wheel ornamental plate structure for disposition between the rim and hub of the wheel including a ring-like plate and a separate circular bead sufficiently resilient to be snapped into engagement with said rim for aiding in holding the outer marginal portion of the plate in cooperation with the wheel rim.

2. As an article of manufacture, an automobile wheel ornamental plate structure for disposition between the rim and hub of the wheel including a ring-like plate and a separate circular bead for aiding in holding the outer marginal portion of the plate in cooperation with the wheel rim, said bead including a plurality of projections for resiliently engaging the wheel rim.

3. As an article of manufacture, an automobile wheel ornamental plate structure for disposition between the rim and hub of the wheel including a ring-like plate and a separate circular bead for aiding in holding the outer marginal portion of the plate in cooperation with the wheel rim, said bead including a plurality of yieldable projections held in tight cooperation with said rim by their engagement with the rim.

4. As an article of manufacture, an automobile wheel ornamental plate structure for disposition between the rim and hub of the wheel including a ring-like plate and a separate circular bead for aiding in holding the outer marginal portion of the plate in cooperation with the wheel rim, said bead including a plurality of yieldable projections held in tight cooperation with said rim by their engagement with the rim, and an arched portion of curved cross-section connected to and disposed over said projections for concealing them.

5. The combination with an automobile wheel including a rim and a hub connected by spokes, of an ornamental cover plate for said spokes and a separate circular bead resiliently pressing against said plate for aiding in holding said plate in cooperation with the wheel.

6. The combination with an automobile wheel including a rim and a hub connected by spokes, of an ornamental cover plate for said spokes and a separate circular bead for aiding in holding said plate in cooperation with the wheel, said bead being held in tight cooperation with the wheel rim solely by reason of its engagement with the rim.

7. The combination with an automobile wheel including a rim and a hub connected by spokes, of an ornamental cover plate for said spokes and a separate circular bead for aiding in holding said plate in cooperation with the wheel, said bead having a flexible toothed portion of normally greater diameter than the surface of the wheel rim to which it is to be applied, the teeth of said portion being deflectable with respect to said rim surface and being formed to apply pressure outwardly against said surface.

8. The combination with an automobile wheel including a rim and a hub connected by spokes, of an ornamental cover plate for said spokes and a separate circular bead for aiding in holding said plate in cooperation with the wheel, said bead having a flexible toothed portion of normally greater diameter than the surface of the wheel rim to which it is to be applied, the teeth of said portion being deflectable with respect to said rim surface and being formed to apply pressure outwardly against said surface, said toothed portion constituting the sole means for retaining the bead in proper position on said rim.

9. The combination with an automobile wheel including a rim and a hub connected by spokes of an ornamental cover plate for disposition over said spokes and having its outer marginal portion formed into a plurality of integral radial projections for engagement with the wheel rim, said projections defining the outer periphery of said plate and being resilient for yieldably biting a surface of said rim.

10. The combination with an automobile wheel including a rim and a hub connected by spokes of an ornamental cover plate for disposition over the spokes including a plurality of integral radially extending teeth for cooperation with the wheel to aid in retaining the plate in proper position over the spokes and an outer circular bead resiliently secured to the wheel rim over said teeth.

11. The combination with an automobile wheel including a rim and a hub connected by spokes of an ornamental cover plate for disposition over the spokes including a plurality of integral radially extending teeth for cooperation with the wheel to aid in retaining the plate in proper position over the spokes, and a circular bead for disposition over said teeth to conceal the same.

12. The combination with an automobile wheel including a rim and a hub connected by spokes, of an ornamental cover plate for disposition over said spokes and having its outer marginal portion provided with a plurality of integral radial teeth for engagement with the wheel rim, and a circular bead disposed over said teeth for aiding in holding the outer marginal portion of the plate in cooperation with the wheel rim and for concealing the teeth on said plate.

13. The combination with an automobile wheel including a rim and a hub connected by spokes, of an ornamental cover plate for disposition over said spokes and having its outer marginal portion formed into a plurality of integral radial teeth on its outer periphery for engagement with the wheel rim, said plate having its inner marginal portion formed for yieldable engagement with the hub of the wheel.

14. As an article of manufacture, an automobile wheel ornamental plate for disposition between the rim and the hub of the wheel, said plate comprising a ring having its outer peripheral portion formed into a plurality of radially extending teeth for cooperation with the wheel rim and having its inner marginal portion flanged to yieldably engage the hub of the wheel.

15. As an article of manufacture, an automobile wheel ornamental plate structure for disposition between the rim and hub of the wheel including a ring-like plate and a circular bead for aiding in holding the outer marginal portion of the plate in cooperation with the wheel rim, said bead being disposed over the outer side of said plate and in yieldable engagement therewith.

16. In combination, a wheel including a rim portion, a hub portion, and a connecting or spoke portion between the rim and hub portions, an ornamental disk for concealing the outer side of the spoke portion and having spring means to directly engage a part of the wheel and retain the disk in adjusted position on the wheel when forced into retaining engagement therewith from the outer side of the wheel while the wheel is attached to the vehicle, said disk having associated with its outer marginal portion a ring-like ornamental bead for increasing the overall diameter of the disk.

17. In combination, a wheel including a rim portion, a hub portion, and a connecting or spoke portion between the rim and hub portions, an ornamental disk for concealing the outer side of the spoke portion and having spring means to directly engage a part of the wheel and retain the disk in adjusted position on the wheen when forced into retaining engagement therewith from the outer side of the wheel while the wheel is attached to the vehicle, said disk having associated with its outer marginal portion a ring-like ornamental bead for increasing the overall diameter of the disk, said bead having resilient projections for resiliently engaging the rim portion of the wheel.

18. In combination, a vehicle wheel including a rim portion, a hub portion, and a connecting portion between the rim and hub portions, an ornamental disk of stamped metallic sheet material for concealing the outer side of the connecting portion, and an annular ornamental moulding associated with the outer margin of the disk and disposed between the disk and the rim edge for increasing the overall diameter of the disk, said moulding having concealed resilient means for yieldably engaging engaging a surface of the rim portion of the wheel.

19. As an article of manufacture, an ornamental disk of sheet metal for disposition between the rim and hub portions of a wheel to cover completely the space separating such portions, said disk having associated with its outer marginal portion a ring-like annular ornamental bead for increasing the overall diameter of the disk and including concealed resilient means for engaging a portion of the wheel.

GEORGE ALBERT LYON.